United States Patent [19]

Massey et al.

[11] Patent Number: 4,558,229

[45] Date of Patent: Dec. 10, 1985

[54] SERIES FERRORESONANT REGULATED RECTIFIER WITH ADDED CAPACITOR SHUNTING THE SATURATING REACTOR WINDING

[75] Inventors: Richard P. Massey, Westfield; Purnell E. Rowe, Maplewood, both of N.J.

[73] Assignee: AT&T Bell Laboratories, Murray Hill, N.J.

[21] Appl. No.: 605,389

[22] Filed: Apr. 30, 1984

[51] Int. Cl.[4] .............................................. H02P 13/04
[52] U.S. Cl. ........................................ 307/17; 363/75; 323/248
[58] Field of Search ................. 307/17; 323/206, 304, 323/309, 248; 363/75

[56] References Cited

U.S. PATENT DOCUMENTS 1,932,667 10/1933 Klinkhamer ........................ 323/304

Primary Examiner—G. P. Tolin
Assistant Examiner—Todd E. DeBoer
Attorney, Agent, or Firm—Alfred G. Steinmetz

[57] ABSTRACT

A series type ferroresonant regulator is modified by adding a second ferro-capacitor in parallel with the primary winding of the saturating transformer. This arrangement allows the transformer to operate at a much cooler temperature than is possible with a conventional series ferroresonant regulator of the same power rating.

2 Claims, 2 Drawing Figures

SERIES FERRORESONANT REGULATED RECTIFIER WITH ADDED CAPACITOR SHUNTING THE SATURATING REACTOR WINDING

FIELD OF THE INVENTION

This invention relates to a ferroresonant voltage regulator and more particularly to a series type ferroresonant regulator having increased power handling capacity.

BACKGROUND OF THE INVENTION

The series type ferroresonant regulator is an economical power supply that provides good voltage regulation at its output over a wide range of variation of its input voltage. Its simplicity of design permits its use in a wide range of applications including many power supplies packaged for a plug in connection into an AC wall outlet terminal.

At present, however, utilization of the series type ferroresonant regulator for direct plug in applications is limited to low power applications of approximately 10 watts or less. At high power applications, the series type ferroresonant regulator is inefficient and generates significant amounts of heat which raise its operating temperature significantly above ambient. A further unique phenomenon of the series type ferroresonant regulator is a tendency to generate large amounts of heat while idling at no load. These power dissipation characteristics have limited the series type ferroresonant regulator to low power applications and have prevented its application to higher power applications despite its many attractive features of small physical size and simplicity of design. It would be advantageous if the series type ferroresonant design could be adapted to accommodate higher power applications without destroying its advantage of small size and design simplicity.

SUMMARY OF THE INVENTION

A series ferroresonant regulated rectifier circuit has been modified in accord with the principles of the invention by adding an additional capacitor in shunt connection with the primary winding of the saturating transformer. The capacitance of the shunt capacitor is selected to have a value so that when summed with the capacitance of the conventional series or ferro capacitor the total summed capacitance is series resonant with the linear region saturated inductance of the transformer. This arrangement allows the ferroresonant regulator to operate at a significantly cooler temperature for a given power level than is possible with a conventional series ferroresonant regulator of the same physical size and power rating.

BRIEF DESCRIPTION OF THE DRAWING

A full understanding of the invention may be readily attained by reference to the following specification and the accompanying drawing in which.

DETAILED DESCRIPTION

Figure 1:
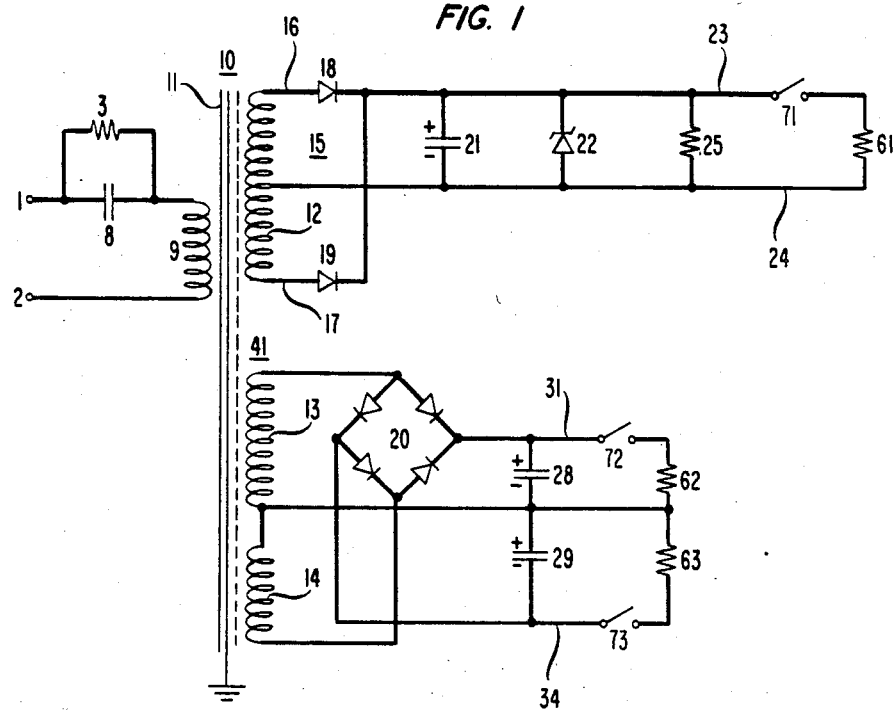
FIG. 1 is a schematic of a series type ferroresonant regulator of the prior art.

A series ferroresonant regulator design of the prior art is shown in FIG. 1 and includes a saturating transformer 10 having a primary winding 9 connected through a series ferroresonant or ferro-capacitor 8 to input terminals 1 and 2 which are in turn connected to a sinusoidal AC source of power such as a commercial AC power line (i.e., a wall outlet). The saturating transformer 10 is designed so that the AC signal applied to the primary winding causes the transformer core 11 to enter its saturation region during each half cycle of operation.

The series ferroresonant capacitor 8 is a linear capacitance whose value is selected to be resonant with the post saturation inductance of the reacting transformer 10. Resistor 3 acts as a discharge path for the charge on capacitor 8. By saturating each half cycle of operation the nonlinear transformer 10 controls the energy stored in the core 11 each half cycle to be substantially constant and since the output wave form is substantially square thereby regulates the voltage at some constant value.

Output power is transmitted through the secondary windings 12, and 41 connected to the full wave 15 and bridge type 20 rectifiers respectively. Secondary winding 12 is center tapped with the end leads 16 and 17 connected to rectifying diodes 18 and 19 of rectifier 15. Rectifier 15 rectifies the regulated AC square wave voltage across secondary winding 12 and applies an undirectional voltage to storage capacitor 21 at some regulated voltage level with its maximum value controlled by the breakdown diode 22 shunting the output terminals 23 and 24 which are connected via switch 71 to a load resistor 61. Resistor 25 acts as a discharge path for the charge on capacitor 21.

Secondary winding 41 is center tapped with the winding divided into two winding segments 13 and 14 wound as a parallel pair. Windings 13 and 14 are both coupled to bridge rectifier 20 to provide two regulated DC voltage outputs of opposite polarity at output terminals 31 and 34 coupled via switches 72 and 73 to load resistors 62 and 63 respectively. Capacitors 28 and 29 are utilized to stablize the output voltages at these output terminals.

In the conventional series type ferroresonant regulator considerable power is dissipated in the transformer 10 causing the regulator to run hot at a temperature level considerably above ambient even at a no load condition. Hence the power level of a typical series type ferroresonant regulator for direct plug in applications must normally be limited to 10 watts or less.

Due to these power limitations the three outputs of the ferroresonant regulator of FIG. 1 cannot all be used at once if the total power consumption exceeds 10 watts. If the voltage available at all outputs is needed for a single application exceeding a 10 watts requirement more than one series ferroresonant regulator must be utilized in order to prevent undue power dissipation in the saturating transformer.

Figure 2:
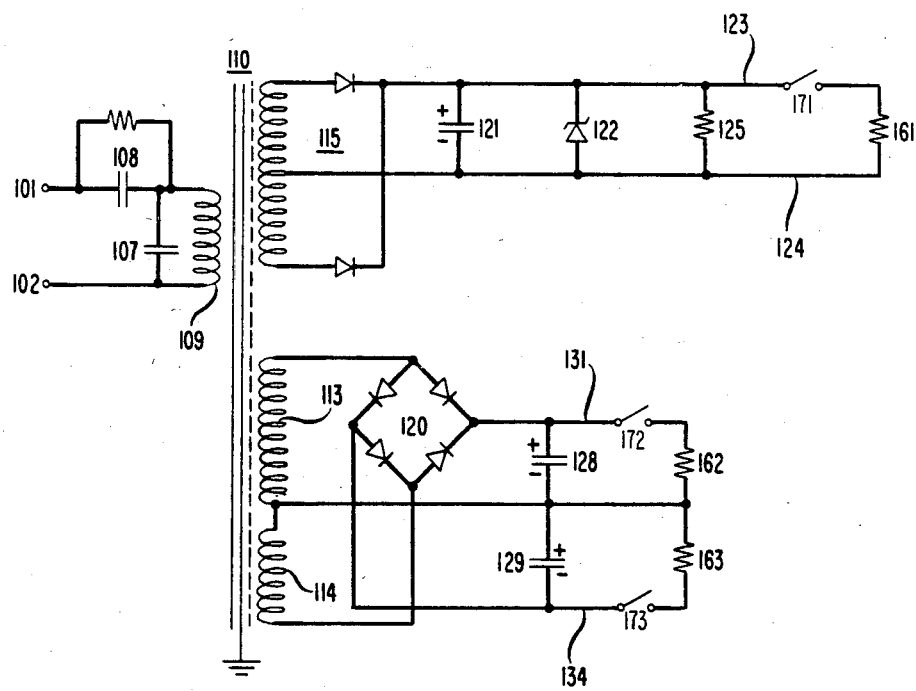
FIG. 2 is a schematic of a series type ferroresonant regulator embodying the principles of the invention.

A new series type ferroresonant regulator embodying the principles of the invention combines the series ferro-capacitor 108 in combination with a second capacitor 107 shunt connected across the primary winding 109 of the ferroresonant transformer 110 as shown in FIG. 2. The AC voltage power source is connected via output terminals 101 and 102, and series ferroresonant capacitor 108 to the primary winding 109 of the saturating transformer 110. A second capacitor 107 is connected in parallel with the primary winding 109. The total capacitance value of the series capacitor 108 and parallel capacitor 107 are related so that the sum of the capacitances is series resonant with the saturated inductance of the saturating transformer at the fundamental frequency of the AC power source coupled to the input terminals 101 and 102. The relative values of the capacitance of the series capacitor and shunt capacitors 107 and 108 are selected so that their capacitance ratio in concert with the quality of the saturated inductance of the saturating transformer 110 maintains the desired input/output voltage ratio. An advantage of the arrangement is that the voltage dividing function of the two capacitors significantly reduces the peak voltage across the primary winding 109.

The series type ferroresonant regulator of FIG. 2 has a first output winding 112 coupled through a full wave rectifier 115 and a voltage stabilizing capacitor 121 to the output terminals 123 and 124 which are coupled via switch 171 to load resistor 161. Breakdown diode 122 acts as an over voltage limit protection device, and resistor 125 operates to slowly discharge the voltage stabilization capacitor 121.

The two winding segments 113 and 114 of secondary winding 141 are coupled through the bridge rectifier 120 to the opposite poled output terminals 131 and 134 respectively. These are in turn connected, via switches 172 and 173 to loads 162 and 163, respectively. Capacitors 128 and 129 provide voltage stabilization at these outputs.

The replacement of the single series ferroresonant capacitor of the circuit of FIG. 1 by the series parallel capacitor transformer winding combination as shown in FIG. 2 according to the principles of the invention advantageously reduces the temperature rise above ambient of the saturating transformer and permits higher power levels of operation to be utilized then is possible with the conventional series type ferroresonant design. For example a series type ferroresonant of conventional design at 10 watts rating may run as high as 80° C. above ambient temperature. A series type ferroresonant regulator of the same power level designed according to the principles of the invention will have a temperature rise above ambient of less than half that value. Hence it is possible to increase the output power of the regulator of FIG. 2 of the same size and temperature rise up to the 20 watt level; furthermore, by increasing the size of the regulator, to a size too large to plug in to a wall outlet but which can free-stand on a table or the floor, the output power can be increased to the 40 watt level, while using conventional transformer Class A or 105° C. insulation materials. The regulator of FIG. 2 will also run cooler at no load than will the circuit of FIG. 1.

What is claimed is:

1. A series type ferroresonant regulator comprising:
   an input means for accepting AC signals operating at substantially a single frequency,
   a transformer having a saturating core in response to AC signals from the input means such that initial operation of the saturating core is in a linear region and changes into a saturating region within each half-cycle of the AC signal, the transformer including a primary winding coupled to the input means and at least a first secondary winding,
   a ferrocapacitor having a first capacitance value and connecting the input means to the primary winding, and connected in series with the primary winding,
   a second capacitor having a second capacitance value and connected in parallel with the primary winding,
   the sum of the first and second capacitance values being a capacitance value series resonant with a linear region saturated inductance of the primary winding and saturating core and a ratio of the first and second capacitance values selected in accordance with a quality of a saturated inductance of the transformer so that a desired input/output voltage ratio is maintained and a voltage dividing action of the ferrocapacitor and the second capacitor significantly reduces a peak voltage across the primary winding, and
   output means connected to the first and second secondary winding and including rectification means.

2. A series type ferroresonant regulator as defined in claim 1 wherein:
   the transformer includes a second secondary winding, and
   second output means coupled thereto,
   the second secondary winding being center tapped and coupled through the second output means to energize two loads.

* * * * *